(No Model.) 2 Sheets—Sheet 1.
F. G. HOFFHEINS.
FERTILIZER DISTRIBUTER.
No. 523,856. Patented July 31, 1894.
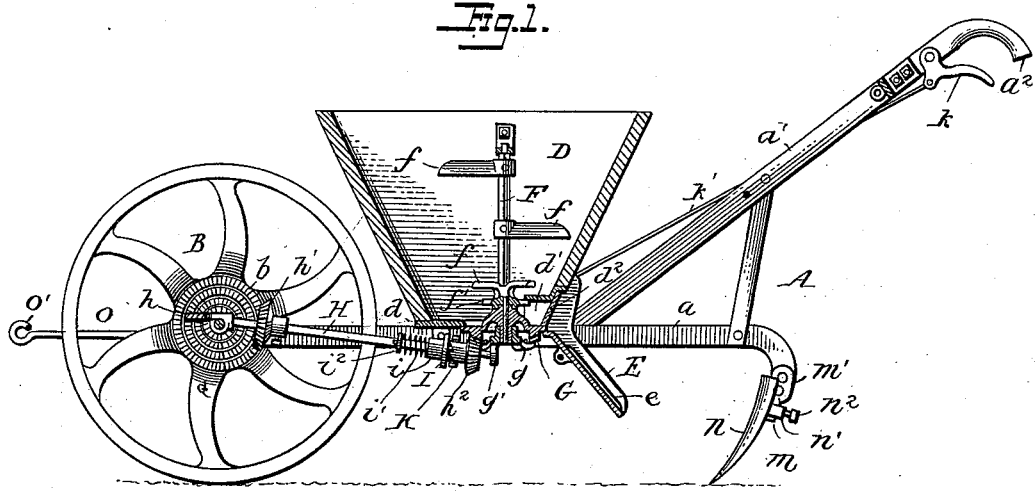
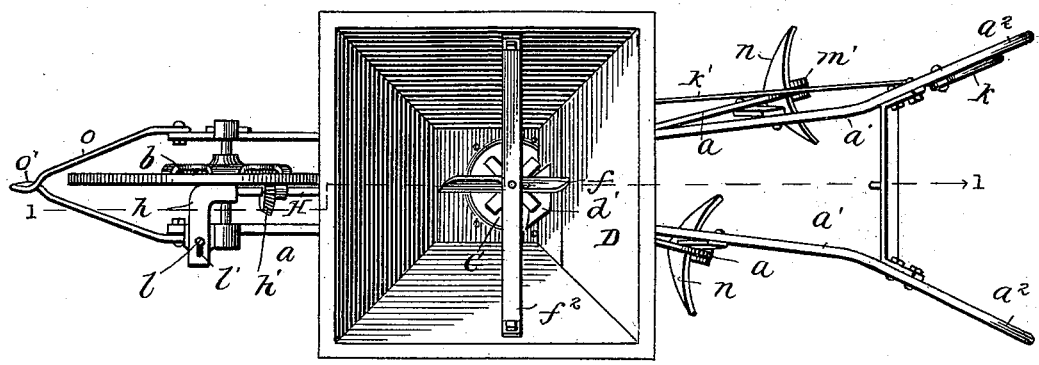
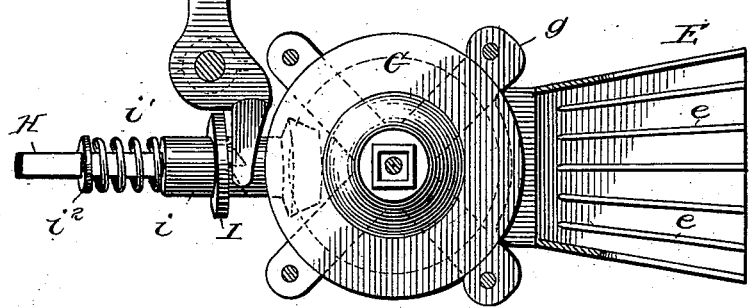
Witnesses
J. J. McCarthy.
Robert Watson
Inventor
Franklin G. Hoffheins
By J. A. Watson
Attorney (No Model.) 2 Sheets—Sheet 2.
F. G. HOFFHEINS.
FERTILIZER DISTRIBUTER.
No. 523,856. Patented July 31, 1894.
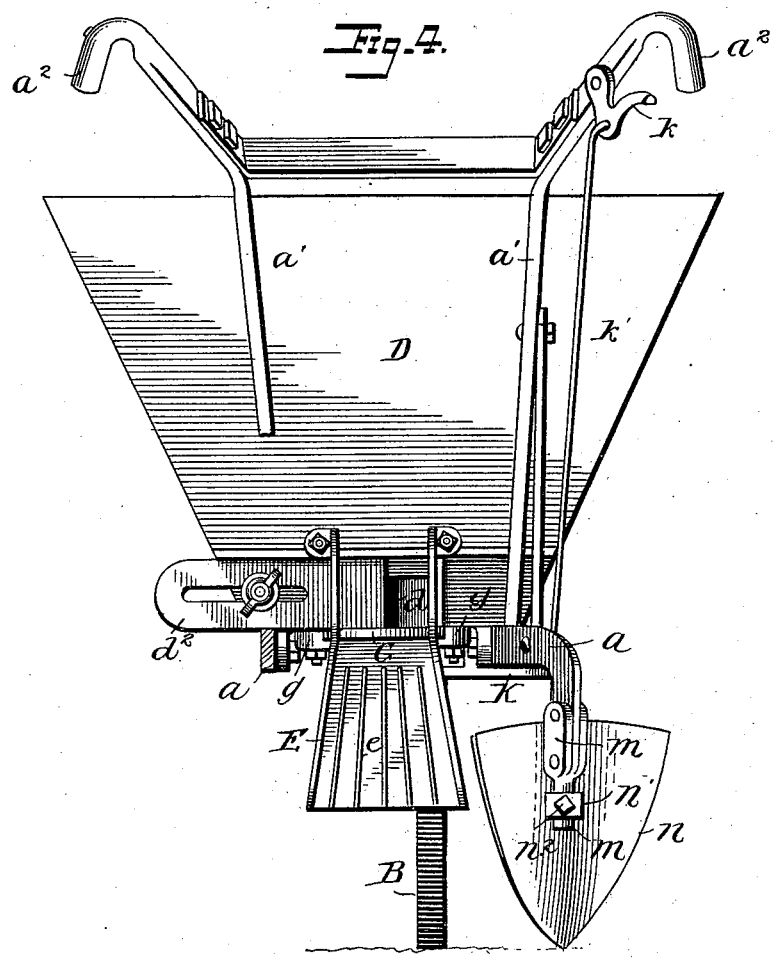
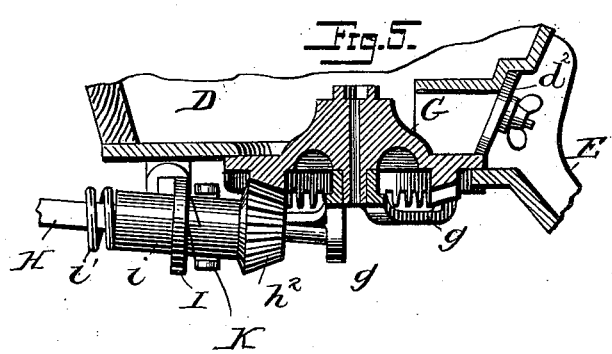
Witnesses
J. J. McCarthy
Robert Watson
Inventor
Franklin G. Hoffheins
By J. A. Watson
Attorney

UNITED STATES PATENT OFFICE.

FRANKLIN G. HOFFHEINS, OF YORK, PENNSYLVANIA, ASSIGNOR TO MICHAEL SCHALL, OF SAME PLACE.

FERTILIZER-DISTRIBUTER.

SPECIFICATION forming part of Letters Patent No. 523,856, dated July 31, 1894.

Application filed January 20, 1894. Serial No. 497,472. (No model.)

*To all whom it may concern:*

Be it known that I, FRANKLIN G. HOFFHEINS, a citizen of the United States, residing at York, in the county of York and State of Pennsylvania, have invented certain new and useful Improvements in Fertilizer-Distributers, of which the following is a specification.

My invention relates to fertilizer distributers, and more particularly to a machine of this class adapted for fertilizing and preparing ground for tobacco and similar crops such as are planted in rows. At the present time it is, to a large extent, customary to sow or scatter the fertilizer in a furrow or drill by hand, and then to cover it with a plow, running the plow up one side and down the other side of the furrow. I am aware that machines of this general nature are now used for various purposes, but the present invention has for its particular object the preparation of ground for planting tobacco and vegetable seeds.

To this end my improved distributer consists in a machine having mounted on its frame a hopper for the fertilizer provided with stirring arms, a discharge opening and a distributing chute having radiating ribs for distributing the fertilizer.

It consists further in a pair of adjustable plows or shovels arranged to follow the distributing chute, the said shovels being adjustable so that the fertilizer may be covered more or less as desired. In front of the hopper is a driving wheel having a series of gears attached to or integral therewith, and a shaft arranged between the driving wheel and the fertilizer feeding and stirring shaft of the hopper, said shaft having a clutch for throwing the stirring devices into and out of operation by means of a clutch-operating lever connected to a hand lever upon one of the handles.

I have found that the machine combining these various features, as illustrated in the accompanying drawings, is very efficient for the purpose specified.

I shall now proceed to describe said machine in such full and clear terms as will enable others skilled in the art to make and use the same, reference being had to the accompanying drawings, in which—

Figure 1 is a longitudinal sectional view taken on the line 1—1 of Fig. 2. Fig. 2 is a plan view. Fig. 3 is an enlarged plan view showing the clutch and the distributing chute, the hopper and stirring shaft being removed. Fig. 4 is a rear view of the machine, and Fig. 5 is an enlarged view of a portion of the machine taken on the same section line as Fig. 1.

A indicates a frame consisting chiefly of a pair of side bars $a$ $a$ and a pair of handle bars $a'$ provided with handles $a''$. In front of the machine is journaled a wheel B which serves to support the forward end and also to drive the stirring and feeding devices. For the latter purpose it is provided with several sets of gear teeth $b$, by means of which the speed of the feeding devices may be varied. The driving wheel is mounted in bearings in the side frame pieces $a$.

D indicates the hopper, mounted upon a bottom plate $d$, which in turn is fastened to the side pieces $a$ of the frame. At the bottom of the hopper is a discharge opening $d'$ which may be varied or closed by an adjustable gate $d''$ provided with a set screw or wing nut for holding it in any desired adjustment. As the fertilizer is fed from the opening $d'$ it falls upon a distributing plate E having upwardly projecting radiating ribs $e$ upon its surface. These ribs serve to spread the fertilizer evenly in the furrow. The chute E is inclined downward sufficiently to permit the fertilizer to run freely over it. Within the hopper is a vertical stirring shaft F provided with arms $f$ in the body of the hopper, and shorter arms $f'$ near the bottom of the hopper which work partially into the discharge opening $d'$. The stirring shaft has a bearing at its upper end in a cross-bar or brace $f''$, and at its lower end it is connected to a gear G, the hub of which is mounted in a bearing in a spider frame $g$ attached to the bottom of the hopper. The gear G has a smooth upper surface which registers with an opening in the bottom plate $d$ of the hopper, and together with the plate $d$ closes the bottom of the hopper. Its teeth project downwardly from the lower side and are beveled. A shaft H is mounted in an adjustable bearing $h$ at the driving wheel and a fixed bearing $g'$ upon the spider $g$. This shaft is provided with a pinion $h'$ which is adjustable longitudinally to permit it to mesh with either of the gears $b$ and which may be fixed at any desired point upon the shaft by means of a set-screw. At its other end the shaft H is provided with a pinion $h''$ which is normally free to turn upon the shaft. The pinion $h''$ is connected with the shaft by means of a clutch I, one member of which is the hub of the pinion $h''$ while the other member is a toothed collar $i$ which is free to slide longitudinally upon the shaft but prevented from turning thereon by means of a feather or other equivalent device. As shown the clutch-section $i$ has a square opening and the shaft H is also square at this point. The clutch-sections are normally held in mesh with each other by a spring $i'$ interposed between the section $i$ and a fixed collar $i''$. The clutch parts may be disengaged at any time by means of a clutch lever K which is operated by a lever $k$ upon one of the handles through the medium of a connecting rod $k'$.

In order to vary the speed of the stirring and feeding shaft, the pinion $h'$ is adjusted upon the shaft H so as to engage with any one of the gears $b$ desired. To accomplish this adjustment, the bearing $h$ is adjustable as shown in Figs. 2 and 5 by means of a bolt $l$ and slot $l'$. In adjusting the pinion $h'$ the bolt $l$ is loosened and the pinion disengaged from the gear $b$ by moving the shaft H laterally. The pinion $h'$ is then adjusted so as to mesh with the particular gear $b$ desired, after which the bearing $h$ is restored to its original position and bolted. The bearing $h$ has an eye through which the shaft of the wheel B passes, thus insuring its remaining in proper position.

The rear ends of the side frame pieces $a$ are bent downwardly and upon them are mounted pintles $m$ to receive the plows or shovels $n$. These pintles each have two lugs $m'$, one on either side of the frame piece, and through the lugs and the frame are passed a pair of pins or bolts. One of these bolts is of metal and the other I prefer to make of weaker material, such as hard wood, so that it will yield or break when the machine comes in contact with any obstruction which would tend to damage it, thus saving the shovel. The shovels $n$ are provided with sockets $n'$ into which the pintles fit, and they may be adjusted and held in any desired position upon the pintles by means of set screws $n''$ or equivalent devices.

Connected to the front end of the side-bars $a$ is a bale or loop O having an eye $o'$ to which a horse may be connected to draw the machine.

From the foregoing detailed description, the operation of my invention will be obvious, and need only be briefly recited. It is presumed that the ground has been prepared with drills or furrows in which it is desired that the fertilizer should be deposited and covered up. The fertilizing material is placed in the hopper and the shovels are adjusted so as to cover the fertilizer and form a ridge for the reception of plants or seeds. The gearing is then set so as to feed the fertilizer through the discharge opening at the proper rate, the speed of the stirring arms depending somewhat on the nature of the fertilizer to be distributed. These arrangements and adjustments being made, all that is necessary is to take hold of the handles and guide the machine so as to keep the driving wheel in the furrow and the covering and ridging shovels at the proper depth. When turning the machine or passing any point, such as a stump or rock, where it is desirable to stop the discharge of the fertilizer, the clutch should be thrown out of engagement by means of the handle $k$.

Having fully described my invention, what I claim, and desire to secure by Letters Patent, is—

1. In a fertilizer distributer the combination with a frame and driving wheel and a hopper in the rear of said wheel having a discharge opening and a valve for said opening, a stirring shaft in the hopper provided with arms, and a driving gear therefor, a shaft and a clutch for connecting said gear with and disconnecting it from the driving wheel, a discharge chute in the rear of the hopper consisting of a plate inclined downwardly from the discharge opening and provided with radiating ribs upon its upper surface whereby the fertilizer is evenly spread in the furrow, and a pair of shovels arranged at the rear of the frame for covering the furrow, substantially as described.

2. In a fertilizer distributer the combination with the hopper having a discharge opening and stirring devices, and with a chute inclined downwardly from said opening and provided with radiating ribs upon its upper surface, of a pair of shovels connected to the side-bars of the frame in the rear of the chute, said shovels being adjustably connected to said bars, whereby they may be more or less inclined, substantially as described.

In testimony whereof I affix my signature in presence of two witnesses.

FRANKLIN G. HOFFHEINS.

Witnesses:
ROBERT M. BARRITSER,
M. S. ADAMS.